United States Patent [19]

Galvin et al.

[11] 4,155,066

[45] May 15, 1979

[54] TRANSDUCER STRUCTURE

[75] Inventors: Aaron A. Galvin, Lexington; Gerard W. Renner, Dorchester, both of Mass.

[73] Assignee: American District Telegraph Company, New York, N.Y.

[21] Appl. No.: 823,720

[22] Filed: Aug. 11, 1977

Related U.S. Application Data

[63] Continuation of Ser. No. 620,932, Oct. 9, 1975, abandoned.

[51] Int. Cl.[2] .............................................. H04B 11/00

[52] U.S. Cl. ....................................... 340/15; 340/558

[58] Field of Search ................ 340/15, 17, 8 S, 258 B, 340/261, 558, 560; 310/322

[56] References Cited

U.S. PATENT DOCUMENTS 3,597,754 4/1968 Lerner ............................ 340/228 R 3,873,866 3/1975 Goble .................................. 310/322

*Primary Examiner*—Theodore M. Blum

*Attorney, Agent, or Firm*—Weingarten, Maxham & Schurgin

[57] ABSTRACT

For use in an intrusion alarm system, transmitting and receiving transducer structures adapted for mounting at the ceiling or other surface of a protected enclosure and providing modified energy patterns. Each transducer structure has reduced sensitivity along the normal or boresight axis thereof, and increased sensitivity along axes angularly displaced from the boresight axis. Each transducer structure includes a resonant cavity terminating in an aperture, the geometric characteristics and dimensions of which provide partial cancellation of energy reflections returned along the boresight axis while enhancing or cancelling to a lesser degree those reflections received along axes angularly displaced from the boresight axis. As a result, the energy pattern is concentrated outwardly in the area being protected and is of reduced intensity along the boresight axis such that reflections along this axis do not result in high intensity standing waves which, if modulated by vibrations or moving air, can cause high system noise levels.

7 Claims, 3 Drawing Figures

TRANSDUCER STRUCTURE

This is a continuation, of application Ser. No. 620,932, filed Oct. 9, 1975, now abandoned.

FIELD OF THE INVENTION

This invention relates to intrusion alarm apparatus and more particularly to transducer structures for use therein.

BACKGROUND OF THE INVENTION

In an intrusion alarm system for the protection of a volumetric space such as a room or other walled enclosure, transmitting and receiving transducers are often mounted in the ceiling of a room or other enclosure for propagation of an energy pattern into the protected space. Strong reflections from the general area of the floor directly below the transmitting transducer tend to be reflected back into the receiving transducer, causing high levels of received energy which, if modulated by vibrations or moving air, can cause high system noise levels. In addition, a transducer having a normal small radiating surface (nominally one wavelength) directed down from the ceiling produces a pattern on the floor which uniformly decreases in intensity for increasing angles outwardly of the boresight axis. Since distance from the transducer to the floor also increases for increasing angles, intruder detection sensitivity decreases correspondingly. In order to obtain uniform detection sensitivity, it would be desirable to compensate for the increased range by providing a pattern which increases for increasing angles outwardly of the boresight axis.

SUMMARY OF THE INVENTION

Briefly, the present invention provides a transducer structure which is especially adapted for use at the ceiling or other mounting surface of a protected enclosure where reflections from the floor or other surface opposite to the mounting surface tend to be reflected back into a receiving transducer. The novel transducer structure includes an ultrasonic, acoustic or electromagnetic generator coupled to a resonant cavity terminating in an aperture. The geometric characteristics of the cavity and its aperture are such to partially cancel reflections returned along the boresight axis, while enhancing or canceling to a lesser degree those reflections received along axes angularly displaced from the boresight axis. The sensitivity of the transducer structure is therefore less along the boresight axis and greater along the angularly displaced axes. In typical implementation the novel transducer structure is embodied within both a transmitting structure and a receiving structure mounted adjacent one another in the ceiling or other mounting surface of a protected enclosure.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
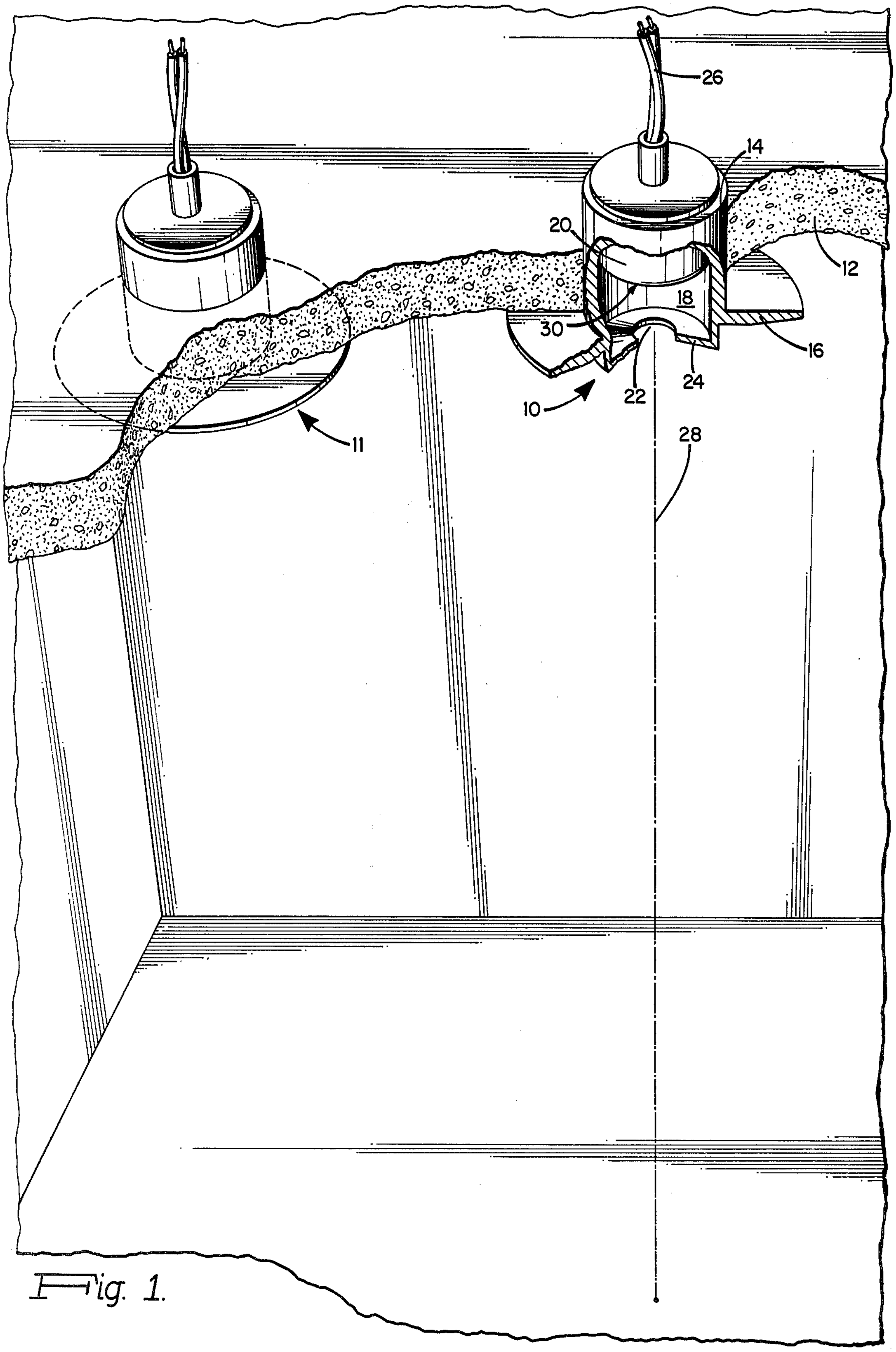
FIG. 1 is a pictorial view of transducer structures according to the invention in typical operating installation.

The invention in typical operating installation is shown in FIG. 1 and includes first and second transducer structures 10 and 11, mounted in a ceiling 12 of an enclosure being protected. The structures 10 and 11 are identical, one serving as a transmitting structure, and the other serving as a receiving structure. Each transducer structure includes a generally cylindrical housing 14 having a circular flange portion 16 by which the housing is secured to the ceiling or other mounting surface. The housing 14 defines a cylindrical cavity 18 therein which confronts an ultrasonic, acoustic or electromagnetic transducer 20 and which terminates in an aperture 22 provided in end wall 24. The transducer 20, for the transmitting structure, is energized by a suitable electrical signal applied to leads 26 and provides an energy pattern within the enclosure being protected and which energy pattern is of selected non-uniform intensity. In the receiving transducer structure, transducer 20 is coupled by leads 26 to the alarm system receiver for processing of signals derived from energy returned from the protected enclosure and from objects therein. The sensitivity of the receiving transducer structure is also selectively non-uniform.

The geometry and dimensions of cavity 18 and aperture 22 in relation to the operating wavelength are such that destructive interference occurs along the normal or boresight axis 28 of the structure, while constructive or less destructive interference occurs along axes angularly displaced from axis 28. The sensitivity is therefore reduced along the boresight axis. For the transmitting structure, transmitted energy is of reduced intensity along the boresight axis and of greater intensity along angularly displaced axes, as will be further described. In the receiving structure, the sensitivity is reduced along the boresight axis such that reflections received along this axis are of reduced intensity.

The aperture 22 is typically about one-half wavelength in diameter, and cavity 18 has a spacing between the aperture surface and the active or radiating surface 30 of transducer 20 equal to one-quarter wavelength at the operating frequency or odd multiples thereof. Cavity 18 and aperture 22 are operative to provide radiation from the aperture along axis 28 which is out of phase from radiation at the transducer surface 30. Radiation from aperture 22 is along angular axes with respect to axis 28 of lesser phase difference or of additive phase relationship with respect to radiation at the transducer surface 30.

Figure 2:
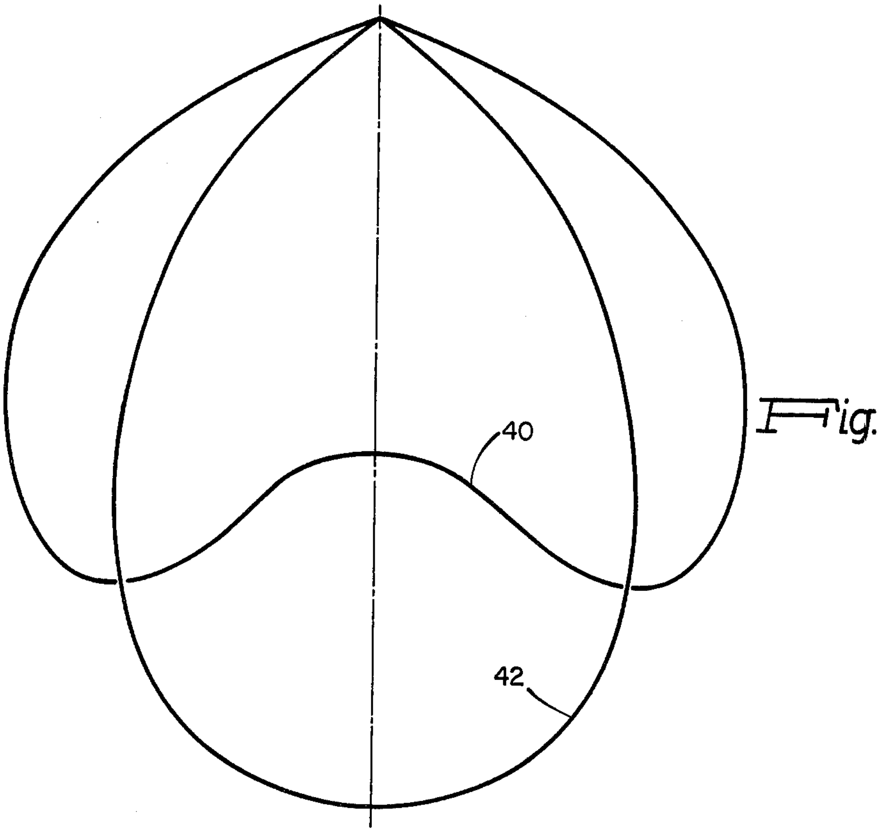
FIG. 2 is a plot of the energy pattern of a transducer structure according to the invention in comparison to a conventional transducer.

The energy pattern 40 of the transducer structure of FIG. 1 is as illustrated in FIG. 2 for any plane of rotation about the boresight axis. For comparison, the energy pattern 42 of a conventional transducer is also shown. It is evident that the energy pattern 40 exhibits greater intensity along axes angularly displaced from the boresight axis, while energy along the boresight axis is of reduced intensity. In pattern 42, maximum energy is provided along the boresight axis and is increasingly less with positions increasingly off axis. Since the energy pattern is concentrated outwardly in the area under protection, interception of an intruder entering this area is more readily accomplished. Reflections along the boresight axis are of lesser magnitude than with pattern 42 of a conventional transducer, and unwanted reflections are thereby minimized.

Figure 3:
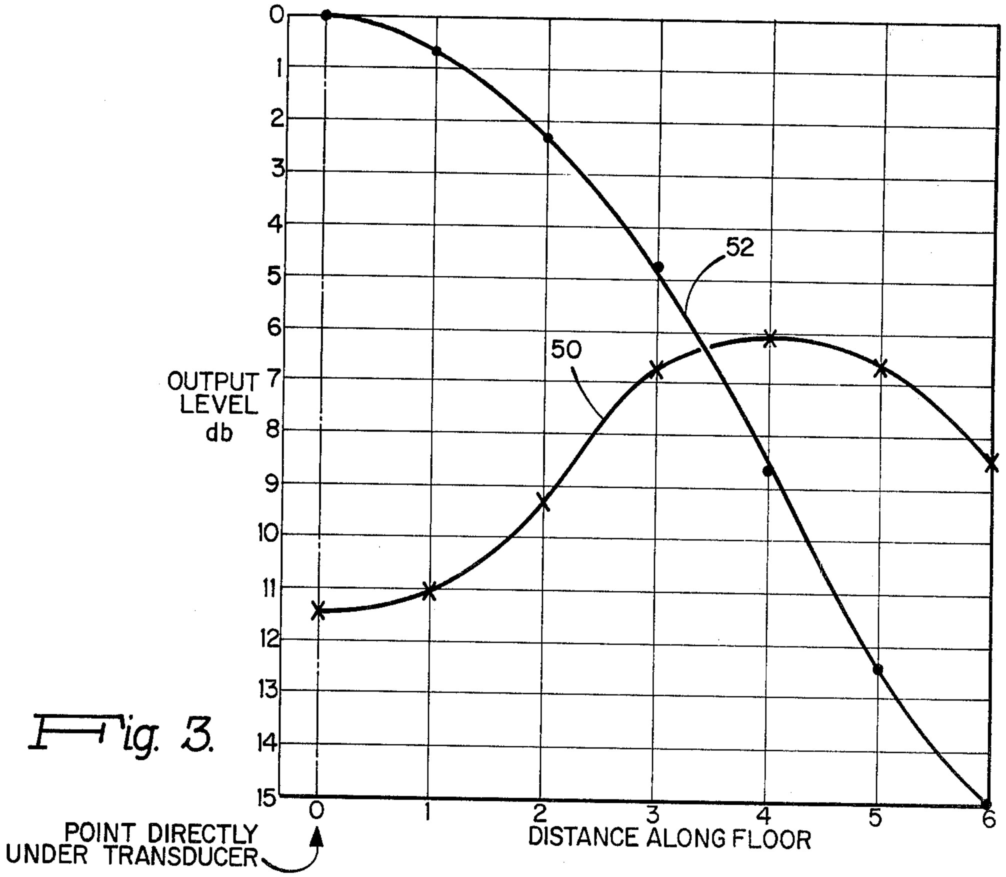
FIG. 3 is a plot of power level versus distance of a transducer structure according to the invention in comparison to a conventional transducer.

In a conventional transducer subject to reflections along its boresight axis, the energy pattern becomes materially degraded at points outwardly from this axis. As shown in FIG. 3, the curve 52 represents the relative output level of a conventional transducer as a function of distance from the boresight axis along the floor or other surface opposite to the transducer mounting surface. It is seen that the output level drops in a substantially linear manner with distance from the point on the floor at the boresight axis. The curve 50 of FIG. 3 shows the enhanced performance of the transducer structure of FIG. 1 for a similar mounting arrangement. The power level is of reduced magnitude at the point on the floor at the boresight axis and is of increased magnitude outwardly from this point.

It should now be evident that the invention provides a modified pattern for both the transmitting and receiving transducer structure which is modified from that provided by conventional transducers to minimize the undesirable effects of reflections along the boresight axis and to provide a more efficient energy pattern within a protected area. The shape of the particular energy pattern provided by the invention can be varied to suit the area to be protected. A pattern which is generally circular in planes parallel to the mounting surface is suitable for many enclosures; however, the pattern may be of other shapes as desired.

As should be evident from FIG. 1, the transducer structures 10 and 11 are conveniently mounted in a ceiling or other mounting surface by insertion within respective openings provided in the ceiling. The transducer structures are maintained in mounted disposition by spring clips or other suitable fastening means. In a typical mounting arrangement, the transducer structures 10 and 11 are part of a transceiver apparatus located above the ceiling and to the housing of which the transducer structures are affixed. The mounting flange 16 of the transducer structures tapers outwardly toward the ceiling surface, and the exposed portion of the resonant cavity containing aperture 22 is substantially flush with the ceiling surface. The transducer structure of the invention is thus capable of unobtrusive installation in a room or other protected area and does not materially detract from the appearance of the room.

The invention can be embodied in ultrasonic, electromagnetic, acoustic or other transducer structures wherein selective interference is provided to achieve the intended modified pattern. It is not intended to limit the invention by what has been particularly shown and described, except as indicated in the appended claims.

What is claimed is:

1. For use in an intrusion alarm system in which an energy pattern is propagated into a protected enclosure, transducer means comprising:

a first transducer operative in response to an energized signal to provide energy of predetermined wavelength;

a first resonant cavity coupled to said first transducer and terminating in a single aperture smaller than the diameter of said first resonant cavity for radiating energy about a boresight axis;

a second transducer operative in response to received energy to provide an output signal representative thereof;

a second resonant cavity coupled to said second transducer and terminating in a single aperture smaller than the diameter of said second resonant cavity for receiving energy about a boresight axis; and each of said first and second resonant cavities having an active surface of the associated transducer at a first surface thereof and said aperture at an opposite surface thereof, the cavity and aperture having dimensions and configuration with respect to an operating wavelength to provide reduced sensitivity along its boresight axis and increased sensitivity along axes angularly displaced from the boresight axis.

2. For use in an intrusion alarm system in which an energy pattern is provided in a protected enclosure, a transducer structure comprising:

a resonant cavity including a closed peripheral wall and an end wall;

an aperture in said end wall and smaller than the diameter of said cavity;

a transducer having an active surface in said cavity and spaced from said aperture;

said cavity and aperture having dimensions and configuration with respect to an operating wavelength to provide reduced sensitivity along the boresight axis of said structure and increased sensitivity along axes angularly displaced from the boresight axis.

3. The invention according to claim 2 further including means for mounting said transducer and resonant cavity to a mounting surface.

4. The invention according to claim 3 further including means for mounting said transducer and resonant cavity within an opening in a mounting surface, the end wall of said resonant cavity containing said aperture being substantially flush with said mounting surface.

5. The invention according to claim 2 wherein the spacing between said transducer active surface and said aperture is an odd multiple of one-quarter wavelength; and wherein said cavity is of cylindrical configuration and said aperture is of diameter of about one-half wavelength.

6. The invention according to claim 2 wherein said aperture is aligned on the boresight axis.

7. The invention according to claim 6 wherein said cavity is in a generally cylindrical housing which includes said end wall substantially flush with a mounting surface, and a circular flange surrounding said end wall for securing said housing to the mounting surface.

* * * * *